United States Patent [19]

Hesselmann

[11] 3,730,234

[45] May 1, 1973

[54] TERMINAL PIN STRAIGHTENING MACHINE

[75] Inventor: Patrick George Hesselmann, Phoenix, Ariz.

[73] Assignee: Honeywell Information Systems Inc., Waltham, Mass.

[22] Filed: Jan. 7, 1972

[21] Appl. No.: 216,150

[52] U.S. Cl. .......................................140/147, 72/404

[51] Int. Cl. ................................................B21f 1/02

[58] Field of Search ........................140/147; 72/404, 72/306, 297

[56] References Cited

UNITED STATES PATENTS

| | | | |
|---|---|---|---|
| 3,687,172 | 8/1972 | Suverkropp | 140/147 |
| 3,525,372 | 8/1970 | Haven | 140/147 |
| 3,603,357 | 9/1971 | Drummond | 140/147 |

*Primary Examiner*—Charles W. Lanham
*Assistant Examiner*—Michael J. Keenan
*Attorney*—Edward W. Hughes et al.

[57] ABSTRACT

A novel machine and method for simultaneously straightening a field of terminal pins inserted into a circuit panel assembly.

16 Claims, 18 Drawing Figures

TERMINAL PIN STRAIGHTENING MACHINE

CROSS REFERENCE TO RELATED APPLICATIONS

Circuit panel assemblies described in the present application and devices for their manufacture are disclosed in copending U.S. Pat. applications Ser. No. 140,169, filed Mar. 4, 1971, by Robert O. Crump and entitled PIN INSERTION HEAD; and Ser. No. 215,970, filed concurrently herewith by Frederick D. Olney, Jr. and Robert O. Crump, and entitled METHOD AND APPARATUS FOR INSERTING PINS INTO A CIRCUIT BOARD, both assigned to the same assignee as the present invention.

BACKGROUND OF THE INVENTION

The present invention relates generally to the manufacture of circuit panel assemblies and more particularly to a machine and method for straightening fields of pins inserted into circuit panels or boards by through-hole pinning technology.

In electronic equipment such as high-speed data processors, the circuit modules are made as small as possible and modules are placed close together to reduce the electrical path lengths, to increase the speed of operation, reduce signal noise and to improve the impedance characteristics of the interconnections. Advances in the microminiaturization of electronic circuits and the attendant increase of functional capability per unit volume of the equipment, places severe design constraints upon the circuit module interconnection and terminal hardware.

As the size of the circuit modules in electronic equipment is continually reduced and the quantity of modules utilized for each unit is increased, the density of the interconnections per unit area of the circuit board assemblies upon which the modules are mounted becomes extremely high.

Examples of problems in the computer art may be seen by considering a presently employed planar circuit board assembly, essentially rectangular in shape, having as many as 4,500 terminal pins inserted through the board, to pin densities as high as 6 pins per square centimeter of single surface board area. It is necessary to make electrical connections between circuit modules mounted on such a circuit board and to connect modules on one board with modules on another board within the unit. One method used to interconnect the electronic circuits of flat-pack microminiature circuit modules or of dual in-line packages (DIP) aligns the leads of the circuit module or DIP with the terminal pins inserted through the circuit board, and attaches and electrically connects the leads of the modules to the terminal pins of the circuit board assembly by any of several techniques well known in the art. One such technique is disclosed in U.S. Pat. No. 3,605,062; another, in U.S. Pat. application Ser. No. 833,986, filed on June 17, 1969. The terminal pins to which the circuit modules are attached may be electrically connected to printed circuit runs forming an integral part of a single or multilayer planar circuit panel assembly.

Another method for interconnecting the circuit modules on a board utilizes automatic machines having one or more tools for wrapping the ends of lengths of wire to terminal pins projecting from the circuit board assembly. The extreme high density of connections required to accommodate the microminiature circuit modules necessitates a degree of terminal pin miniaturization and packing density difficult to acquire without sacrifice of reliability and ease of making automatically wrapped wire connections. Additionally, when numerous terminal pins are inserted through and secured in a planar module board, it is extremely difficult, if not impossible, to obtain uniformly parallel pins. The terminal pins must be precisely located, within the tolerance zone of the automatic or semi-automatic wire wrapping machines to prevent the wrapping tools from striking and bending or even breaking the pins, or damaging the wrapping bits or circuit board hardware, thus slowing the wrapping process. Additionally, pins offset or bent in excess of the tolerance of the wrapping tool bit hole diameter to pin diagonal clearance will produce binding forces during the wrapping operation which may result in screw wraps, i.e., wraps in which the wire is distorted to a screw thread form, and the attendant defective electrical connections.

During the manufacture of the circuit board assemblies there is a tendency in certain regions of the board for terminal pins to be slanted from the vertical. Over the entire board, an average variance of approximately 0.015 inch in any direction from the true position at the center of the pin tips may be obtained using the pin-insertion equipment described in the referenced copending U.S. patent applications. In order to prevent decreased output during the wire wrapping operation due to misaligned pins, pin variances within a 0.008 inch true position radius (TPR), and a 0.005 inch pin to pin registration are desirable.

Similarly, when attaching circuit module assemblies as, for example, by the previously referenced techniques or by soldering DIP assemblies to terminal pins using the socalled dead-bug attachment method, terminal pin alignment and straightness are critical. In the latter named technique the DIP bodies abut the surface of the circuit panel and the DIP lead members extend perpendicularly outward from the panel, juxtaposed with corresponding terminal pins. The lead/terminal-pin pairs are then soldered together, using a solder mask, or spring pressure from the DIP leads to hold the DIPs in place. The assembly is then passed over a flow solder machine to form the solder joints. Straight pins are required to allow easy removal of the solder mask in the first-named process, and to ensure good solder joints in the second. There is a tendency, in the former, for the solder mask used during the process to become jammed due to out-of-position terminal pins, making removal of the mask difficult and causing defective solder joints.

Prior art pin straightening machines have employed mechanically complex tools having a sleeve inserted over individual pins to grip the pin near its juncture with the circuit panel and twist the pin end radially at least one-half turn to reset the pin to a more nearly vertical position at the pin end. In addition to the disadvantage of mechanical fatigue which may be introduced by the twisting action, the prior art pin straighteners have generally been unable to achieve a deflection from center of straightened pins within a 0.010 inch TPR. Additionally, the complex nature of the twisting mechanism of the prior art pin straighteners precludes the straightening of more than a few pins during a single straightening operation.

SUMMARY OF THE INVENTION

The present invention alleviates the problems of the prior art by providing a machine for simultaneously straightening a plurality of pins inserted in a circuit board. Straightening of an entire field of pins is achieved by holding the circuit panel assembly, capturing the ends of the pins in an apertured plate and simultaneously deflecting all pins uniformly in one direction to a point of permanent mechanical set, and then resetting the pins by simultaneously deflecting all of the pins in the opposite direction a sufficient distance past center so that upon release of the pin ends, the residual spring in the pins returns them to a centered position. A second deflection operation as described above at 90° from the first, completes the straightening process.

The pin straightening machine of my invention includes a tray for gripping the circuit panel assembly. A floating plate or lid is provided with a plurality of apertures for receiving the upper ends of the terminal pins of the circuit panel assembly. The lid may rest either on the edges of the tray or upon the pin ends. In one embodiment, the tray receives the circuit panel assembly and grips the edges of the circuit board. Preferably, however, the bottom of the tray may be provided with an apertured plate, the apertures forming a mirror image of the apertures in the floating lid. In this preferred embodiment, the lower pin ends, rather than being supported on or above the bottom surface of the tray, are received into the apertured plate and are gripped thereby during the straightening operation. The circuit panel itself is not held by the tray in the latter described embodiment.

The tray assembly containing a circuit board is inserted into the straightening mechanism by sliding the tray bottom between guides on a platform of the machine and engaging an actuating lug mounted on the floating lid into a recess formed in the actuating rod of the mechanism. During the straightening operation, vertical support to prevent the board from bowing may be provided by the base of the tray assembly and the floating lid. The tray assembly base is supported by the machine platform base; the lid is restrained vertically by heavy members of the machine.

It is, therefore, a primary object of my invention to provide a novel machine and method for straightening fields of terminal pins of a circuit panel assembly.

It is another object of my invention to provide a pin straightening machine having a novel means for holding a circuit panel assembly and transmitting stress to the terminal pins thereof.

DESCRIPTION OF THE DRAWINGS

The invention is pointed out with particularity in the appended claims, however, other objects and features of the invention will become more apparent and the invention itself will be best understood by referring to the following description and embodiments taken in conjunction with the accompanying drawings in which:

DETAILED DESCRIPTION OF THE INVENTION

Figures 1, 2:
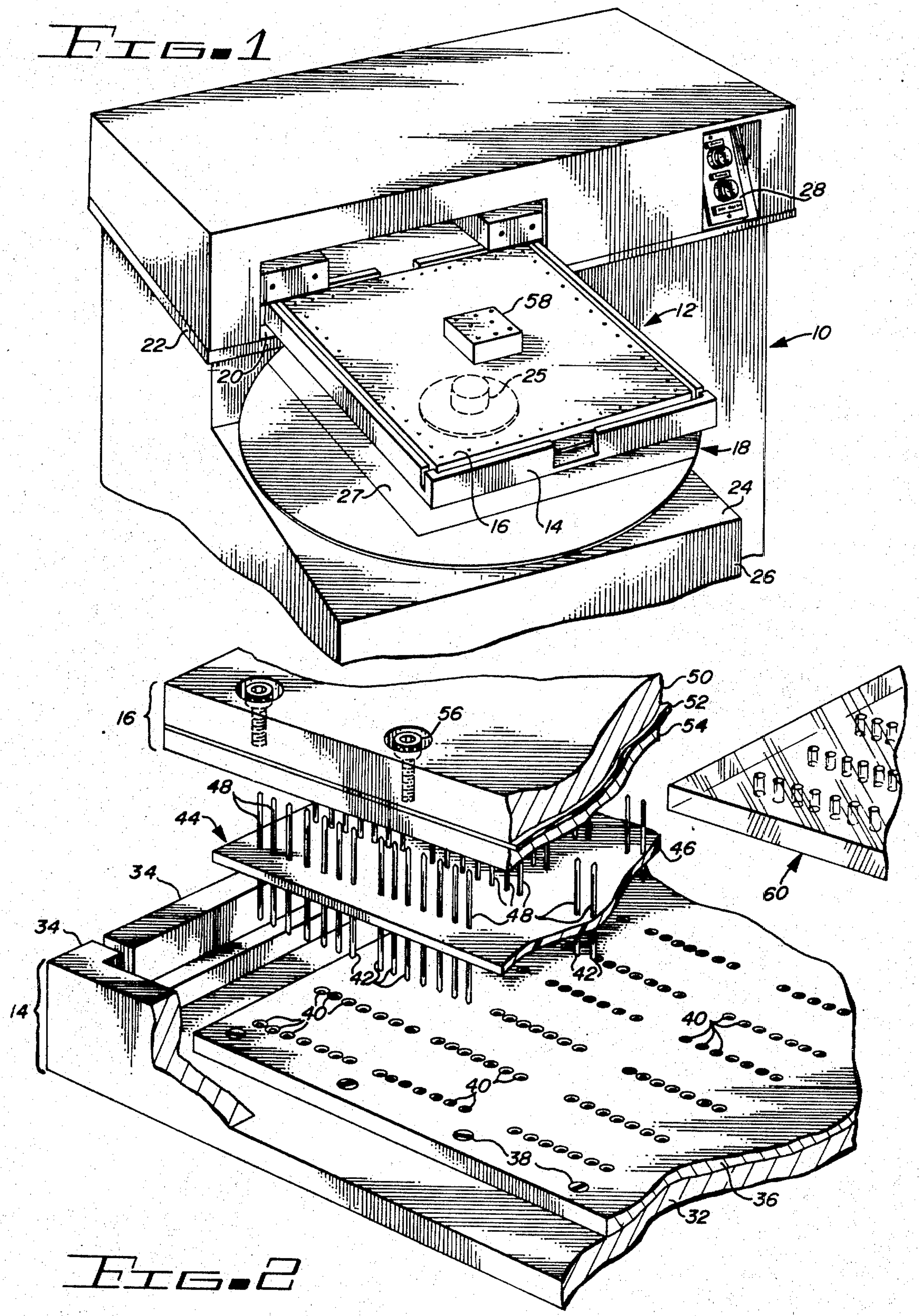
FIG. 1 is a perspective view of the pin straightening machine, showing the slidable tray assembly.
FIG. 2 is an exploded cutaway isometric view of one embodiment of the tray assembly.

Referring now to FIG. 1, the general features of the pin-straightening machine 10 are shown including a slidable tray assembly 12 having a base member or tray 14 and a floating lid 16. The tray assembly 12 is shown resting in part on a rotatable table 18 and partially on a surface 20 of a suitable supporting and platform structure 22. The surface 20 of the platform 22 and the upper surface 27 of the rotatable table 18 share a common plane. The surface 27 of the table 18 may be a thin sheet of material to aid in sliding the tray assembly 12 into and out of the machine. The material may be any commercially available thermoplastic sheet providing a slippery surface such as nylon or polytetrafluorethylene. The table 18 is a simple lazy-susan type device mounted on and adapted to rotate about a central axial member 25 securely mounted to the top 24 of an extended support structure 26 of the machine 10. An operator panel 28 is provided with suitable switches for actuating the pin-straightening mechanism as will be described hereinafter.

A detailed cutaway and exploded view of the tray assembly 12 of the preferred embodiment is shown in FIG. 2. The tray assembly 12 includes the base member 14 having a bottom 32, side walls 34, and a holding plate 36 securely mounted on the bottom 32 by screws 38. A plurality of pin-receiving holes 40 perpendicular to the plane of the holding plate 36 are drilled therein. The holes 40 may be drilled in a universal pattern, i.e., each hole spaced an equal distance from an adjacent hole, in regular rows and columns over the entire surface of the board, or the holes 40 may be drilled in a particular pattern as shown in FIG. 2. The holes 40 in the holding plate 36 are adapted to receive pin ends 42 of a circuit board assembly 44. The typical circuit board or circuit panel assembly 44 of FIG. 2 is shown having a planar panel 46 with a plurality of terminal pins 48 inserted therethrough. The planar panel 46 may be a single layer structure as shown in FIG. 2, or more commonly, a multilayer structure with each layer having a printed-circuit array constructed thereon. The individual layers are laminated to form a single planar board. The circuit arrays of the individual layers may be interconnected as by plated-through holes, through which holes the terminal pins 48 may be inserted or driven, thereby making contact with the circuit arrays.

The terminal pins 48 may be firmly attached to the panel 46 after insertion, as for example by reflow soldering or wave soldering.

The floating lid assembly 16 of the tray 12 includes a top plate 50 and an upper holding plate 54 fastened together with screws 56. A bumper pad 52 of any firm, resilient material such as rubber or a suitable plastic material is sandwiched between the plates 50 and 54. The upper holding plate 54 is provided with pin-receiving apertures (FIG. 6) the pattern of which forms a mirror-image of the pattern of holes 40 in the holding plate 36.

A template 60, shown in FIG. 2, is provided for the convenience of the operator and does not form a part of the tray assembly 12. The template 60, having a plurality of gauge holes drilled therethrough, is used by an operator for gaugeing the straightness of the pins 48, subsequent to a straightening operation.

Figure 5:
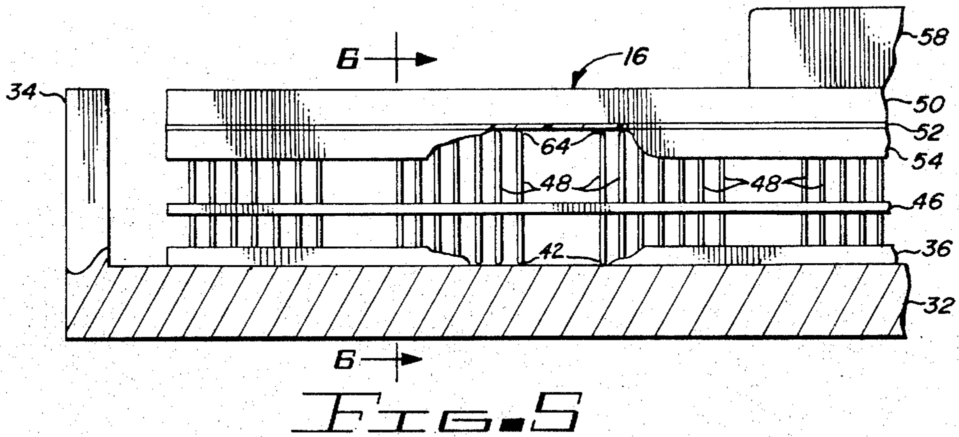
FIG. 5 is a cutaway section taken through the center of one embodiment of the tray assembly.

An actuating lug 58 (FIGS. 1 and 3) is securely fastened to the top plate 50 of the lid assembly 16 by machine screws, bolts or other suitable fastening means. Referring now to FIG. 5, there is shown a cutaway section of the preferred embodiment of the tray assembly containing a circuit board assembly. The ends 42 of the terminal pins 48 inserted through the planar panel 46 rest on the bottom 32 of the tray assembly base member. The floating lid assembly comprising the actuating lug 58, the top plate 50, the bumper pad 52 and the upper holding plate 54 rests atop the terminal pins 48. The bumper pad 52 contacts and rests upon the upper pin ends 64, thus protecting the pin ends from damage.

Figure 6:
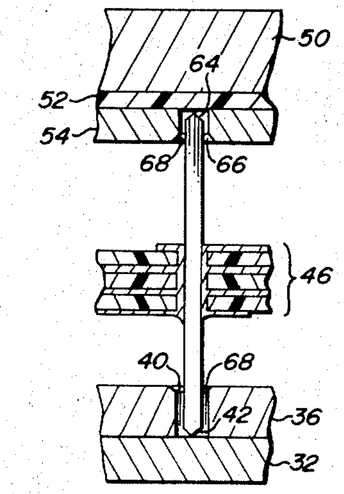
FIG. 6 is an enlarged section view taken along lines 6—6, of FIG. 5.

FIG. 6, a section view taken along the lines 6—6 of FIG. 5, shows more clearly the arrangement of a circuit board assembly resting inside of the preferred embodiment of the tray assembly. Referring now to FIG. 6, one of the pin-receiving holes 40 drilled in the holding plate 36 is shown with the lower end 42 of a terminal pin received therein. The holes 40 are formed with a lead-in taper or countersunk surface 68. Similarly, pin-receiving apertures 66 in the upper holding plate 54 of the floating lid assembly are provided with a lead-in taper or countersunk surface 68. The lead-in tapers 68 allow easier insertion of the circuit panel assembly pin ends 42 into the holes 40 of the holding plate 36, and easier placement of the lid assembly atop the pin ends 64. The holes 40 and 66 require precise location for placement of the pin ends 42 and 64 therein, consequently, the holding plate 36 and the upper holding plate 54 are fabricated from tool steel. Other parts of the tray assembly 12 may be fabricated less expensively from other metals, as for example, anodized aluminum.

Figure 9:
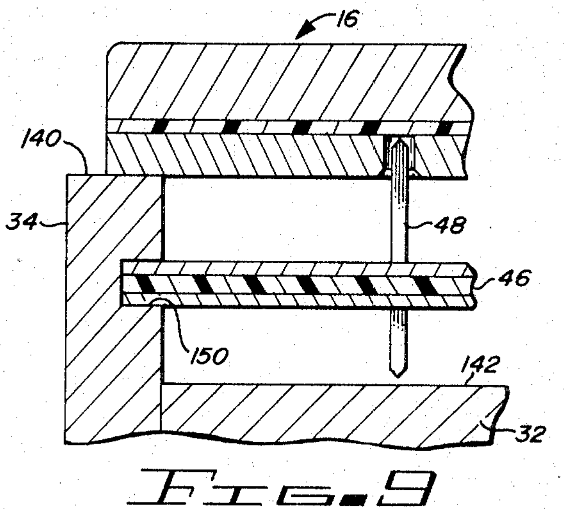
FIG. 9 shows another embodiment of the tray assembly.
Figure 8:
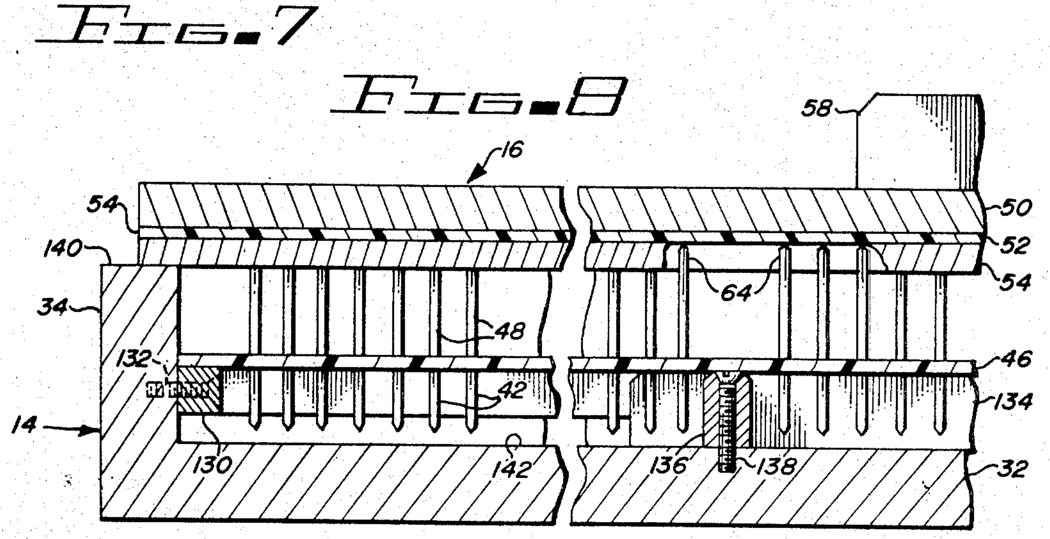
FIG. 8 shows an alternate embodiment of the tray assembly.
Figure 8A:
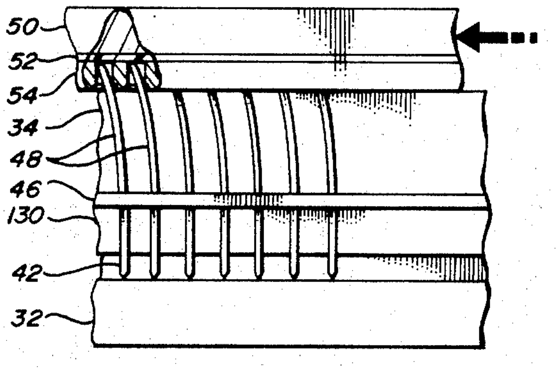
FIGS. 8a through 8d show an alternate embodiment of the pin-straightening process.
Figure 8B:
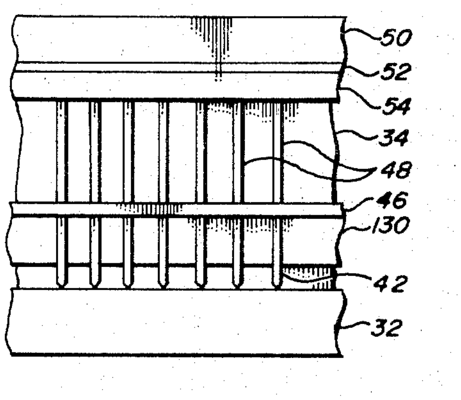
Figure 8C:
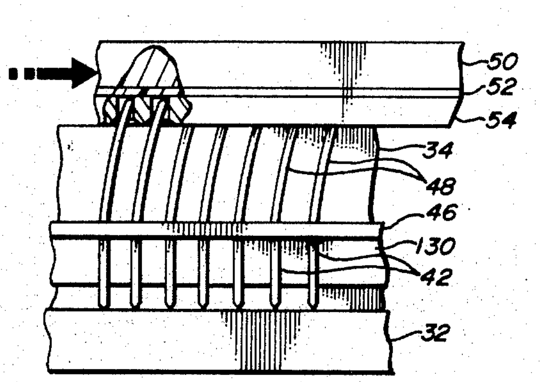
Figure 8D:
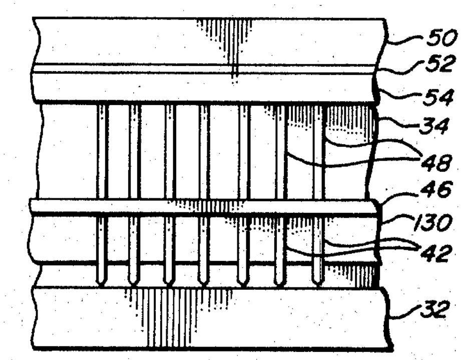

Alternate embodiments of the tray assembly 12 of FIG. 1 are shown in FIGS. 8 and 9. Referring to FIG. 8, the panel 46 of the circuit board assembly is supported around the periphery of the panel 46 by a metal flange 130 attached to side walls 34 of the base member 30. The side wall 34 prevents lateral movement of the panel 46.

The flange 130 may be attached to the walls 34 by any suitable fastening means such as machine screws 132. The embodiment shown in FIG. 8 is suitable either for circuit panel assemblies as shown, with the pins 48 protruding a substantial distance from both surfaces of the panel 46, or for circuit panel assemblies having the terminal pins 48 protruding substantially only from one surface (the upper surface in FIG. 8) of the panel 46. Support bars 134 and 136 attached to the bottom 32 by machine screws 138 provide additional support for the panel 46. Alternately, the flange 130 may be located lower than shown in FIG. 8 so as to allow the bottom ends 42 of the terminal pins 48 to rest lightly on the upper surface 142 of the bottom 32 of the tray, see FIGS. 8*a–d*. Support afforded by the bars 134 and 136, or by the pin end 42 resting on the surface 142 prevent the panel from bowing when lateral force is applied to the actuating lug 58 of the lid assembly 16.

FIG. 9 illustrates another embodiment whereby the panel 46 is supported at its peripheral edges in a channel 150 formed in the side wall 34. Additional support for the panel 46 may also be provided as previously described with reference to FIG. 8.

The floating lid assembly 16 may rest upon a top surface 140 of the side walls 34 as shown in FIGS. 8 and 9. This arrangement is alternative to the embodiment described with reference to FIGS. 2 and 5 wherein the lid assembly rested atop only the pin ends 64 of the circuit panel assembly.

Figure 3:
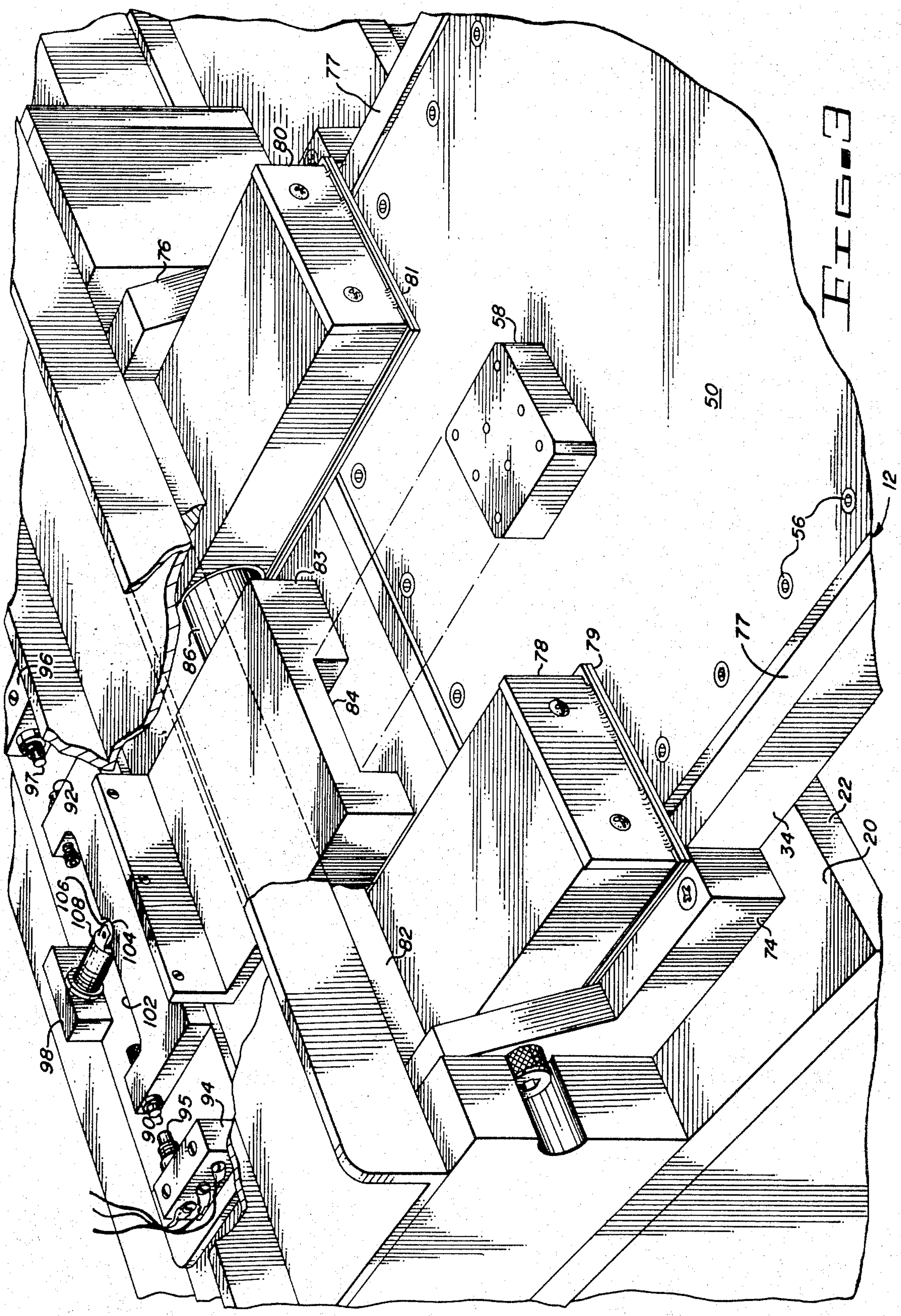
FIG. 3 is a cutaway isometric view of the actuating station of the pin straightening machine, showing the manner in which the lid of the tray assembly is engaged by sliding into the actuating mechanism.

FIG. 3 illustrates the manner in which the tray assembly 12 is slidably engaged into the actuating mechanism of the pin-straightening machine. As the tray assembly slides onto the surface 20 of the supporting platform 22, a pair of metal guide blocks 74 and 76 attached to the platform 22 guide the tray assembly into the proper fixed position on the platform 22. Upper guide block assemblies 78 and 80 restrain and prevent the tray assembly lifting off the platform 22. Slider plates 79 and 81 are attached to the upper guide blocks 78 and 80. The slider plates 79 and 81 are of the same or a similar anti-friction material as the thin sheet of material forming the surface 27 (FIG. 1) of the rotatable table 18. The slider plates 79 and 81 bear lightly on a top surface 77 of the side walls 34 of the tray base member. The upper guide block assemblies 78 and 80 are attached to a steel support bar 82, and also to their respective guide blocks 74 and 76. Both the guide blocks 74, 76 and the upper guide block assemblies 78, 80 may be removed and replaced with members having greater or less thickness to accommodate tray assemblies of different sizes.

As the tray assembly is slidably engaged between the guide blocks 74 and 76 and beneath the guide block assemblies 78 and 80, the actuating lug 58 atop the floating lid assembly 16 is received into a recess 84 in an actuator 83. The actuator 83 is attached to an actuator rod 86 adapted for reciprocal movement along the axis of the rod 86 in response to a force applied parallel to the axis. In the preferred embodiment, a hydraulic system is used to apply the force, however, any suitable means may be utilized, as for example, manual force applied through mechanical leverage, or electromotive force applied through an appropriate driving mechanism. An example of the latter may be a rack and pinion drive adapted to translate the rotational movement of an electric motor into reciprocal movement of the actuator rod 86.

FIG. 3 shows the actuator 83 in a centered position for receiving the actuating lug 58 of the tray assembly. The centering of the actuator as well as the limits of its reciprocal movement are controlled by a system of electrical limit switches attached to the support structure of the pin-straightening machine. Attached to and movable with the actuator 83 is a limit-stop assembly 102 having a left limit-stop pin 90 and a right limit-stop pin 92. Both limit-stop pins 90 and 92 are adjustable. A left-limit switch 94 and a right-limit switch 96 have corresponding actuating plungers 95 and 97. A center-position sensing switch 98 having a plunger assembly 108 with a wheel 106 is attached to the machine support structure. The wheel 106 is received into a recess 104 formed in the limit-stop assembly 102, when the reciprocal movement of the actuator rod 86 results in alignment of the recess 104 with the plunger assembly 108. When the wheel 106 moves into the recess 104, tension on the plunger assembly 108 is released opening the switch 98. Opening the switch 98 serves to deactivate the force-producing means, thus stopping the actuator 83 in the centered position as shown in FIG. 3.

Figure 4:
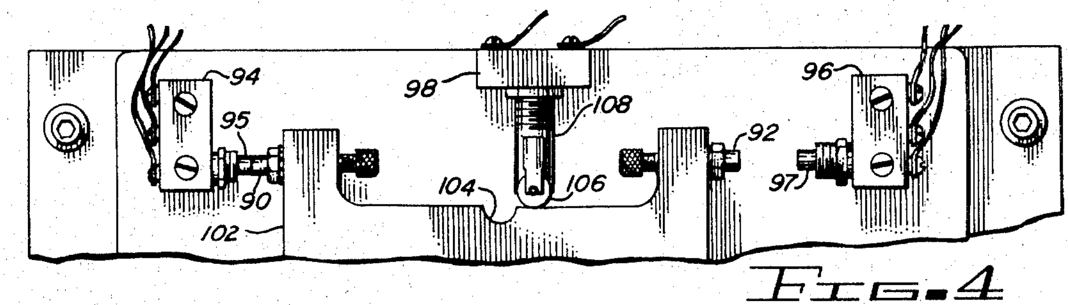
FIG. 4 is a detailed plan view of the adjustable limit-switch mechanism.

An alternative view of the limit stop and centering mechanism is shown in FIG. 4. In this view, the limit-stop assembly 102 and the recess 104 have moved leftward away from the wheel 106 depressing the plunger assembly 108 and actuating the switch 98. Actuation of the switch 98 is an indication that the actuator 83 (FIG. 3) and correspondingly the floating lid member 16 of the tray assembly have moved away from the center position. Continued movement of the lid and the limit-stop assembly 102 (from right to left in FIG. 4) has caused, as shown, the left limit-stop pin 90 to contact and depress the plunger 95 of the left-limit switch 94. Movement of the limit stop assembly 102 of FIG. 4 from left to right will cause the right limit-stop pin 92 to contact and depress the plunger 97 of the right limit-stop switch 96. Both the left and right limit-stop pins 90 and 92 are adjustable to change the distance of travel of the floating lid assembly from center position.

Figure 7:
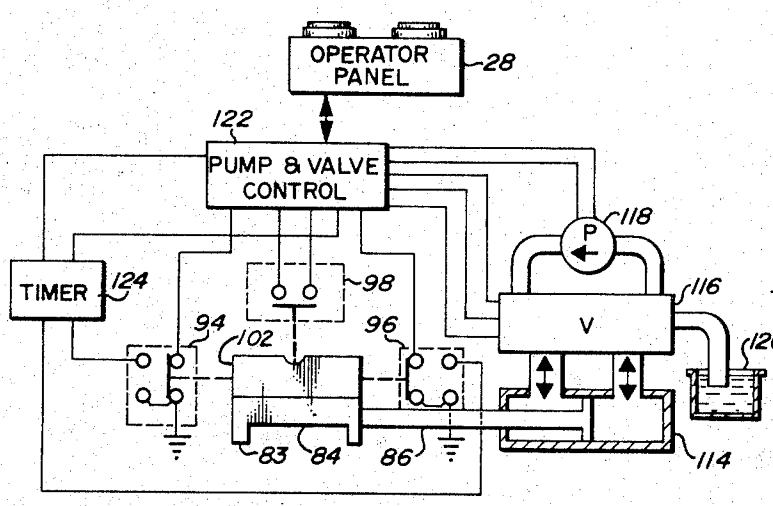
FIG. 7 is a schematic diagram of the preferred actuating mechanism of the pin-straightening machine.

FIG. 7 is a schematic diagram of the actuating mechanism and the associated control members of the preferred embodiment of my invention. The actuator 83 having the recess 84 therein for receiving the actuating lug 58 (FIGS. 1, 3 and 8) is shown connected to the actuator rod 86. The limit-stop assembly 102 is shown schematically in FIG. 7 as it appears in FIG. 3, (i.e., in the centered position. Force is applied to the actuator rod 86 by a hydraulic system comprising a two-way cylinder 114, a directional valve 116, a pump 118, and a reservoir 120. In response to the depression by an operator of an actuating switch on the operator panel 28, a pump and valve control unit 122 actuates the pump 118, which may be driven by any suitable means such as an electric motor (not shown). Concurrently, the pump and valve control unit 122 controls the directional valve 116 to port fluid under pressure from the pump 118 into the appropriate chamber of the hydraulic cylinder 114. The movement of the actuator 83 (and the engaged floating lid assembly 16) is controlled in growth and decay of the movement so that the maximum excursion will be sufficient to stress the pins beyond their elastic limit. The stressing movement increases for approximately one-third of the cycle, see FIG. 10, from T0 to T2. The movement is stopped and held at its peak, for one-sixth of the cycle, from T2 to T3, and then reversed, allowing the actuator to return to the centered position during the remaining half of the cycle, from T3 to T6. It should be noted that the FIG. 10 timing diagram represents only the first portion, or the initial deflection phase of the pin-straightening operation. A diagram similar to that of FIG. 10 representing movement in the opposite direction during the corrective deflection phase has been omitted as redundant.

Figure 10:
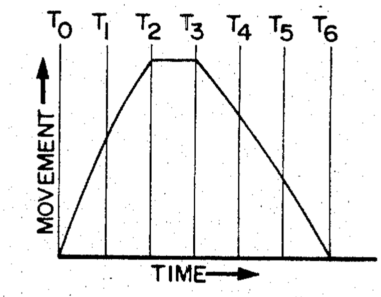
FIG. 10 is a graph of the timing of a pin-straightening cycle.

Referring now to FIG. 7 in conjunction with FIG. 10, a timer 124 is actuated at time T2 when either of the limit switches 94 or 96 are actuated in response to movement of the limit stop assembly 102. The timer 124, which may be a time-delay relay, supplies an appropriate signal to the pump and valve control unit 122 both at T2 time and at T3 time, when the timer 124 times out. In response to the T2 signal, the pump and valve control unit 122 controls the valve 116 to close the ports leading to the cylinder 114, thus holding the actuator rod 86 in a fixed position. The pump and valve control unit 122 responds to the T3 signal from the timer 124 to control the valve 116 and allow the actuator rod 86 to return to the centered position.

Referring now to FIGS. 5 and **5*a–d*, a method for straightening terminal pins using the preferred machine embodiment of my invention will now be described. After placing the pin ends 42 of the circuit board assembly 44 into the holding plate 36 and setting the lid assembly 16 atop the ends 64 of the pins 48, the entire tray assembly 12 is slidably engaged into the machine (FIG. 3), the actuator lug 58 received into the recess 84 of the actuator 83**.

Figure 5A:
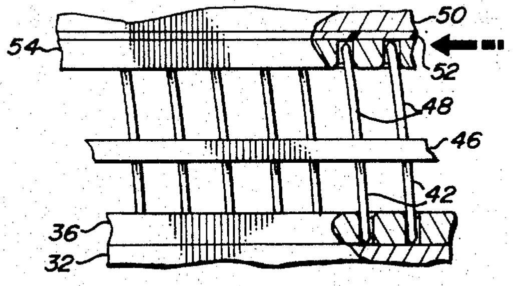
FIGS. 5*a* through 5*d* show successively the same small portion of the assembly of FIG. 5 during the various phases of the pin-straightening process.

FIG. 5a illustrates a small portion of the assembly of FIG. 5 at time T2 (FIG. 10) during the first portion, or the initial deflection phase of the straightening operation. The ends of the pins 48 inserted through and held in the planar panel 46 are shown captured at their bottom ends by the holding plate 36, and at their top ends by the upper holding plate 54. Force applied to the actuating lug 58 of the floating lid assembly is represented by the arrow in FIG. 5a. The force causes the upper holding plate 54 to move leftward relative to the stationary holding plate 36.

It is to be understood that the distance of travel, i.e., the offset between the plates 54 and 36 of FIG. **5*a* (as well as the travel distances illustrated in FIGS. 3 and 4), have been exaggerated for clarity. The actual distances are smaller than illustrated, and are determined empirically for each type of terminal pin by bend-testing samples of pins having different hardnesses, lengths, and cross-sectional areas. The terminal pins 48** may be of any suitable material, for example, phosphor-bronze, beryllium-copper, etc. In selecting the material, the electrical conduction properties as well as mechanical properties such as resilience, hardness, etc., of the material should be considered. In one example, a sample lot of 1 inch long phosphor-bronze terminal pins having a square cross-sectional area 0.025 inch on a side was bend-tested to determine the optimum deflections required for the straightening process. The tested pins were held and forces were applied in a manner similar to the operational environment of the tray assembly. It was found that an initial deflection of 0.125 inch was sufficient to impart a set of 0.038 ± 0.003 inch to the pins. The optimum corrective deflection, i.e., deflection past the center in the opposite direction of the initial deflection, was found to be 0.065 ± 0.003 inch. The optimum corrective deflection was sufficient to rehset the pins to $0 \pm 0.003$ deflection from center.

Figure 5B:
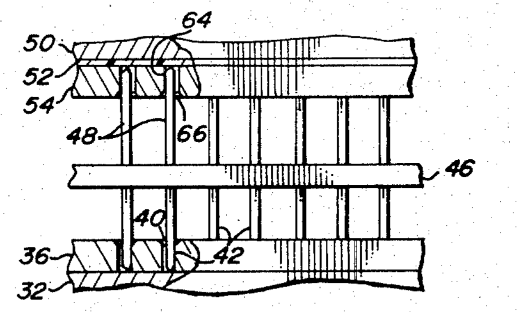

FIG. 5*b* illustrates the terminal pins 48 at time T6 (FIG. 10) after the upper holding plate 54 has been returned to the centered position. Note that a set has been imparted to the pins 48 by the lateral bending operation (the initial deflection) shown in FIG. 5*a*. Accordingly, the upper pin ends 64, FIG. 5*b*, are shown to be bearing against the left edge of the apertures 66 in the upper holding plate 54. The lower pin ends 42 correspondingly bear against the right edge of the holes 40 in the holding plate 36, the lower pin ends having been stressed and set in the opposite direction from the upper pin ends 64.

A single depression of the actuating switch on the operator panel 28 (FIG. 1) initiates a complete sequence including the initial deflection and the corrective deflection.

Figure 5C:
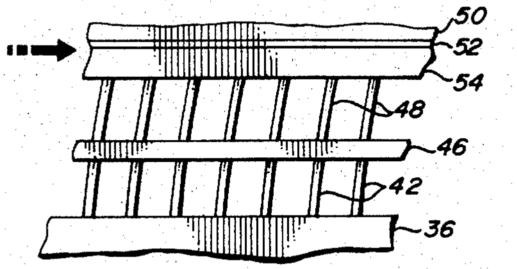
Figure 5D:
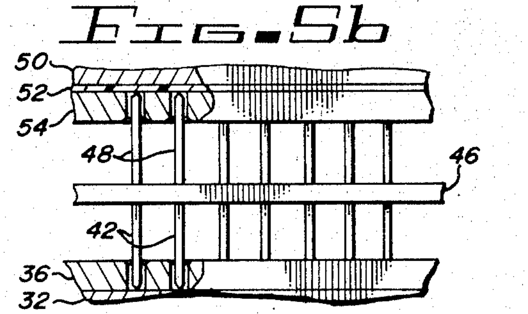

FIG. 5*c* illustrates the next step of the sequence, wherein the corrective deflection is effected. A force (indicated by the arrow) is applied to the upper holding plate 54 in a direction opposite to the force first applied (FIG. 5*a*). The lateral offset of the plate 54, FIG. 5*c*, is less than the initial offset (FIG. 5*a*) as previously described. The corrective deflection stresses the pins 48 beyond their elastic limit to impart a re-set sufficient only to return the pins to substantially a vertical position. Following the corrective deflection, illustrated in FIG. 5*c*, the upper plate 54 is returned to the centered position, see FIG. 5*d*, and the residual spring of the pins 48 returns them to a position of zero deflection in planes perpendicular to the force vectors. One complete cycle of the machine as described above produces pin straightness within the tolerance previously described with reference to the testing of the pin samples. It has been found, however, during empirical testing, that several repeated cycles tighten the deviation from zero deflection of the straightened pins to ±0.000+.

Referring now to FIG. 1, the straightening operation as described above with reference to FIGS. 5 and 5*a–d* is repeated after disengaging the tray assembly 12 from the actuating station of the machine 10, sliding the tray assembly 12 onto the table 18, rotating the table and tray assembly 90°, and reinserting the tray assembly into the actuating mechanism. The stressing operations, repeated with force vectors applied (to the pin ends) at 90° to the originally applied forces, completes the straightening of all the pins of the circuit panel assembly. The straightened pins may be gauged for straightness by aligning and dropping the template 60 (see FIG. 2) over the field of pins. The template, having accurately drilled gauge holes, should slip freely onto the field of pins if all the pins are straight.

FIGS. 8*a* through 8*d* illustrate the pin-straightening process similar to that hereinbefore described with reference to FIGS. 5*a* –*d*. The FIG. 8*a–d* process shows an alternate tray assembly embodiment as previously described with reference either to FIG. 8 or 9. It is understood that the lower pin ends 42 are not stressed during the FIG. 8*a–d* process, the circuit panel 46 being gripped by the tray base member.

From the foregoing detailed description it will be appreciated that the previously stated objects and advantages, as well as others apparent from this specification, have been achieved by the embodiments described herein.

Obviously, many modifications and variations of my invention are possible in the light of the above teachings. The pin straightening machine described herein is suitable for straightening fields of pins in circuit boards providing uniform support in all directions at the juncture of the pins with the board. It is obvious that my machine may be modified to apply force vectors in the same direction to both the bottom and top ends of the terminal pins in order to straighten the pins of circuit panels which fail to provide such uniform support. It is therefore understood that my invention may be practiced otherwise than as specifically described and it is intended by the appended claims to cover all such modifications of the invention which fall within the true spirit and scope of the invention.

I claim:

1. A machine for straightening a plurality of pins of a circuit panel assembly, said machine comprising:
 a base member for gripping the circuit panel assembly;
 a floating lid having a generally planar surface, said lid having pin-receiving apertures in said surface, ends of said pins received in corresponding ones of said apertures, said planar surface generally perpendicular to said plurality of pins;
 means for applying a force to said floating lid in a first vector parallel with said planar surface, said force translated to a side of each of said received pin ends, said force displacing the lid in relation to the base member a distance sufficient to stress the pins longitudinally beyond their elastic limit; and
 said force applying means further including means for applying an opposite force to the lid in a vector opposite said first vector, said opposite force displacing the lid a distance sufficient to stress the pins longitudinally beyond their elastic limit to reset all of said received pins mutually parallel in planes perpendicular to said force vectors.

2. The pin-straightening machine of claim 1, further comprising:
 means for rotating said base member 90° in relation to said force applying means.

3. The pin-straightening machine of claim 1, wherein said base member includes:
 a tray having a bottom and a wall;
 a flange on a side of said wall, said flange supporting the panel of said circuit panel assembly above said bottom;
 said wall preventing lateral movement of said panel.

4. The pin-straightening machine of claim 3, wherein said lid rests slidably on said wall.

5. The pin-straightening machine of claim 3, wherein said bottom includes a bar attached thereon for further supporting the circuit panel above said bottom.

6. The pin-straightening machine of claim 3, wherein alter ends of said pins rest on said bottom.

7. The pine-straightening machine of claim 1, wherein said base member includes a holding plate having a generally planar upper surface, said holding plates having pin-receiving holes in said upper surface, alter ends of said pins received in corresponding ones of said holes.

8. The pin-straightening machine of claim 1, wherein said base member includes:

a tray having a bottom and a wall, said wall having a panel-receiving channel, perimetric edges of the panel of said circuit panel assembly received in said channel, said channel supporting said panel above said bottom and preventing lateral movement of said panel.

9. The pin-straightening machine of claim 8, wherein said lid rests slidably on said wall.

10. The pin-straightening machine of claim 8, wherein said bottom includes a bar attached thereon for further supporting the circuit panel above said bottom.

11. The pin-straightening machine of claim 8, wherein alter ends of said pins rest on said bottom.

12. A method for straightening fields of terminal pins inserted into a panel of a circuit panel assembly, comprising the steps of:

A. gripping the circuit panel assembly;

B. capturing an end of each of the terminal pins to be straightened;

C. applying a lateral force simultaneously to all of the captured pin ends to move the captured pin ends laterally in relation to the panel a distance sufficient to impart a set to all of the terminal pins captured;

D. removing the applied force;

E. applying a second lateral force simultaneously in a direction opposite the first applied force to all of the captured pin ends to move the captured pin ends laterally in relation to the panel a distance sufficient to impart a mutually parallel re-set to all of the terminal pins captured;

F. removing the second applied force;

G. rotating the circuit panel assembly 90°; and

H. repeatinG steps C through F.

13. The method of claim 12, further comprising the step of:

I. simultaneously gauging the straightened pins for mutual parallelism and relative separation.

14. The method of claim 12, wherein the gripping step comprises gripping the panel of the circuit panel assembly.

15. The method of claim 12, wherein the gripping step includes capturing an alter end of each of the terminal pins to be straightened.

16. The method of claim 14, Wherein the capturing step further includes the step of restraining movement of all of the captured pins along their longitudinal axes.

* * * * *